United States Patent

[11] 3,547,062

[72] Inventor Ion Rainu
8470 Boulevard des Mille-Iles, Laval, Quebec, Canada
[21] Appl. No. 613,567
[22] Filed Feb. 2, 1967
[45] Patented Dec. 15, 1970
[32] Priority Feb. 2, 1966
[33] Canada
[31] No. 951,376

[54] FLOATING DEVICE
4 Claims, 5 Drawing Figs.
[52] U.S. Cl. .................................................. 114/66.5
[51] Int. Cl. .................................................. B63b 1/18
[50] Field of Search ........................................... 9/6; 244/119, 101; 114/66.5F, .5F

[56] References Cited
UNITED STATES PATENTS
| | | | |
|---|---|---|---|
| 3,058,704 | 10/1962 | Bergstedt ..................... | 244/119 |
| 1,827,181 | 10/1931 | Alfaro .......................... | 244/119X |
| 2,391,326 | 12/1945 | McKinley ..................... | 114/66.5 |
| 2,547,146 | 4/1951 | Anthony ....................... | 9/6 |

OTHER REFERENCES
Kollwitz 1,147,133, April 11, 1963 German allowed application

Primary Examiner—Andrew H. Farrell
Attorney—Raymond A. Robic

ABSTRACT: A hydroplane float entirely made of glass fibers reinforced plastic and formed of an outer tubular shell, two load-bearing transverse sections to which the hydroplane load is applied, a series of transverse stiffening inner ribs projecting from substantially the lower half of the shell and a series of longitudinal stiffening ribs projecting from substantially the upper half of the shell.

INVENTOR
Ion RAINU

ATTORNEY

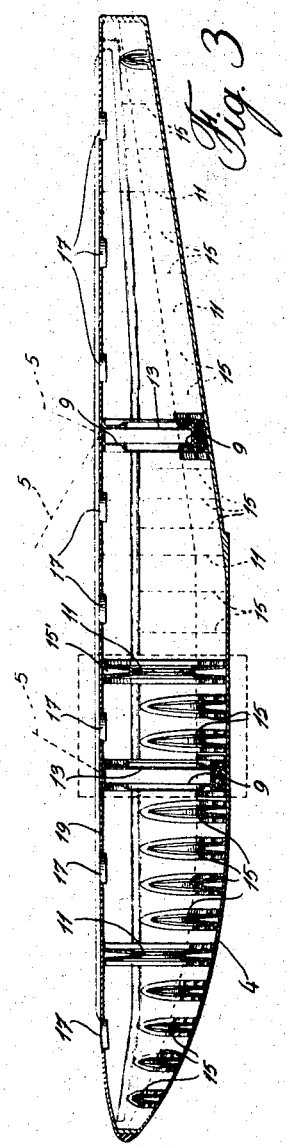
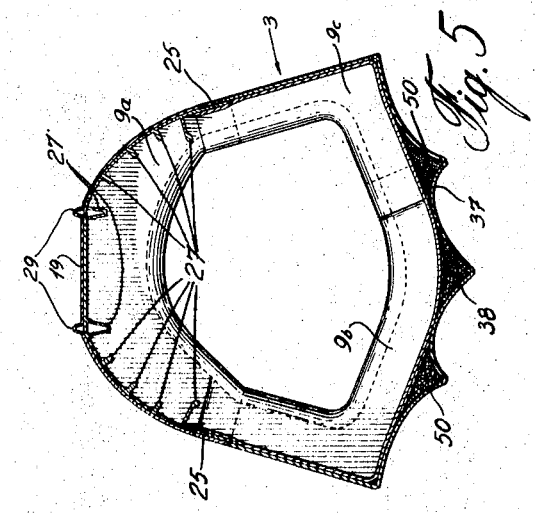
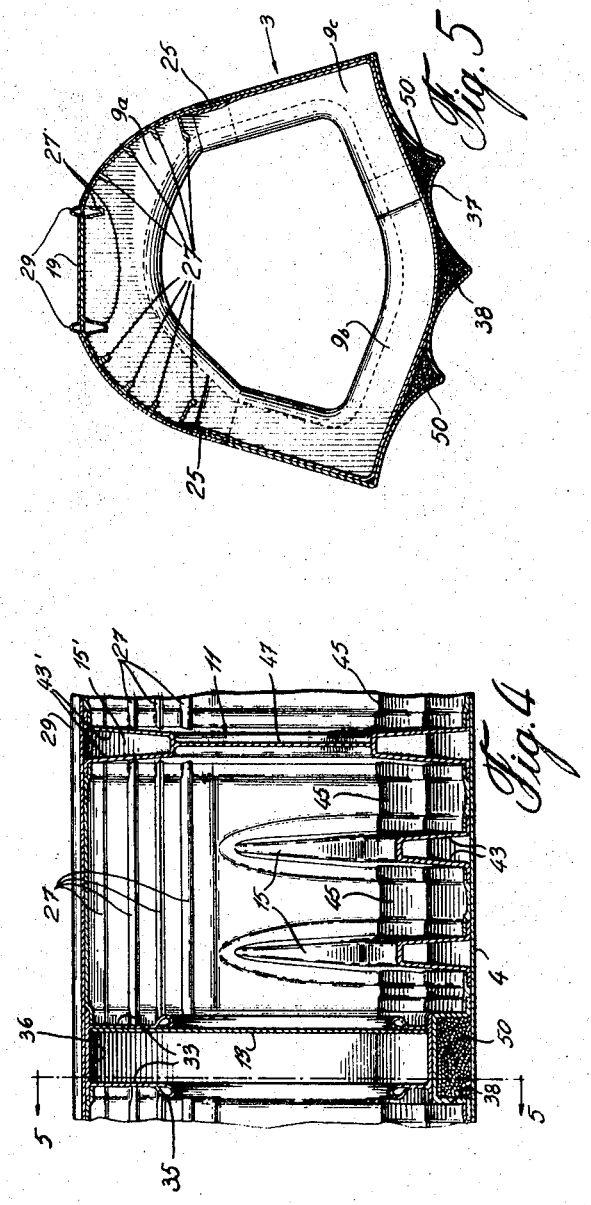
INVENTOR
Ion RAINU
BY
ATTORNEY

FLOATING DEVICE

The present invention is directed to a floating device and more particularly to a float for hydroplane. It also relates to floats for mounting on the wings of aircraft to allow the latter to retain proper balance on landing.

More specifically, the invention pertains to a float of the above type which is made entirely of glass fibers reinforced plastic.

Some attempts have recently been made to use plastic material and more particularly glass fibers reinforced plastic in combination with metal members, particularly aluminum, but this solution has been found unsatisfactory due, it seems, to an inadequate bond between the plastic material and the metal framework and consequently an unsatisfactory transfer of forces between the two materials.

Strictly apart from an extremely improved appearance, a float made of plastic material can be produced at a much lower cost and therefore the field offers attractive commercial possibilities. Unfortunately, it was generally accepted in the trade that a float entirely made of plastic material could not satisfactorily be made because it was held that the material could not withstand the requirements of rigidity, solidity and flexibility established by transport authorities in the particular case of aircrafts.

I have however been able to device a particular structure, entirely made of glass fibers reinforced plastic, which has been fully tested in accordance with the stiff transport code requirements and not only has it successfully met such requirements but has been able to withstand loads much in excess of the minimum established and in fact has withstood in some aspects the test better than the conventional float structures.

These results were obtained with a float made according to the invention which comprises an outer elongated tubular shell made entirely of glass fibers reinforced plastic and having at least two load-applying transverse sections; a transverse load-bearing inner member surrounding said shell at each of said transverse sections, said members made entirely of glass fibers reinforced plastic and bonded to the inner surface of said casing; a series of transverse stiffening ribs projecting from substantially the lower half of said shell and entirely made of glass fibers reinforced plastic bonded to the inner surface of said shell, and a series of longitudinal stiffening ribs projecting from substantially the upper half of said shell and entirely made of glass fibers reinforced plastic bonded to the inner surface of said shell.

With the above structure, it has been possible to obtain a high resistance to bending and torsion stresses. In fact, a float made according to the invention as described above has been tested by the transport department of the Federal Government and has shown to be able to withstand 157 percent of the required ultimate strength.

The invention will now be described with reference to the appended drawings wherein:

FIG. 3 is a longitudinal cross-sectional view taken along line 3–3 of FIG. 1;

FIG. 4 shows, on a larger scale, the portion of FIG. 3 inscribed in a dotted rectangle;

FIG. 5 is a cross-sectional view of the floating device taken along line 5–5 of FIG. 4.

Figure 1:
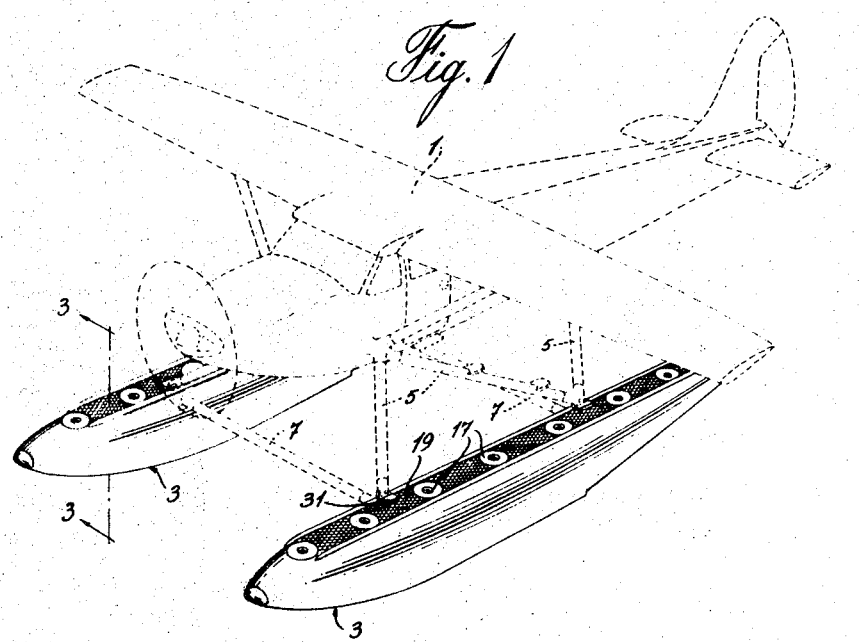
FIG. 1 is a perspective view of two floats made according to the invention and shown mounted on a hydroplane, illustrated in dotted lines.

With reference to the drawings and particularly to FIG. 1, the hydroplane 1 is shown as supported by a pair of floats 3 through a load-transmitting structure represented by struts 5 interconnected by transverse rods 7.

The general outline of the structure of the invention is illustrated in FIG. 3 wherein it will be seen to comprise an outer generally tubular shell 4 completely made of glass fibers reinforced plastic and generally having the usual conventional shape.

Figure 2:
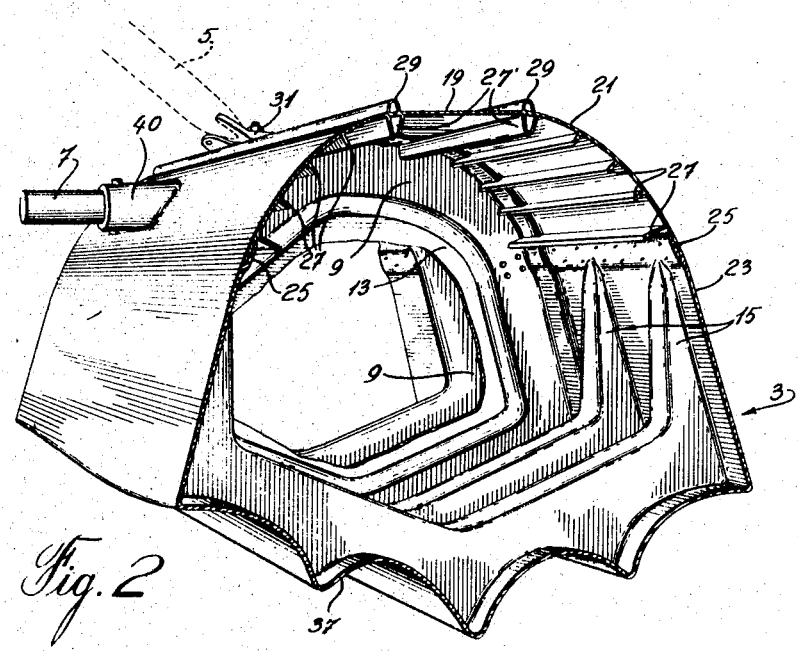
FIG. 2 is a perspective view of a portion of the float according to the invention.

As mentioned previously, this outer shell is reinforced by two load-bearing or main members 9 located at the sections where the load is to be applied by struts 5, the latter being shown in dashed outline in FIG. 2. Main members 9, as clearly shown, extend completely around the inner surface of the shell, transversely thereof, and are preferably formed as channel-shaped members having side flanges 33 (FIG. 4) terminated inwardly thereof by beaded or rounded collars 35. Flanges 33 are connected by a web 36 applied against the inner surface of the shell and solidly bonded thereto.

In a preferred manner of manufacture, these transverse main members 9 are preferably made separate from the shell and possibly of three separate parts 9a, 9b and 9c (FIG. 5) solidly bonded and integrated together in a manner well-known in this art. Similarly, the shell 4 may be made of two parts, a lower shell and an upper shell bonded together along a longitudinal seam or joint 25.

As in known floats, the float of the invention has part of the bottom thereof defining a wavy outline as shown in FIG. 5 and for that reason a generally inverted channel-shaped bridge 38 is formed transversely of the sections where the main members 9 are to be applied (FIG. 3 and 4). For further rigidity and support, the voids 50 within these channel-shaped bridges 38 are filled with powdered bakelite microballons prepared with a phenolic resin. The bottom of the main members 9 may be applied directly thereon or with the interposition of a mat (not shown) of glass fibers reinforced plastic.

The structure of the invention further comprises a series of spaced transverse stiffening ribs 15 projecting upwardly from the bottom of the shell 4 and solidly bonded thereto. Most of the stiffening ribs 15 cover only the lower half shell with the lateral sides thereof thinning out as they merge toward the general longitudinal central line of the shell as clearly illustrated in FIGS. 2, 3 and 4. The bottom of ribs 15 is made to conform to the wavy shape in that portion of the shell where the latter takes a corresponding shape.

Strips 45 of glass fibers reinforced plastic cloth bridge the spaces between adjacent ribs and between the said ribs and the main members 9 at the bottom of the shell to solidly join them together as well as to bond them to the shell 4.

Ribs 15' are also provided that are somewhat higher and extend fully around shell 4 and further have a membrane 47 also made of glass fibers reinforced material whereby the total structure of the latter ribs and membranes 47 form watertight bulkheads 11 generally evenly distributed along the shell 4 as shown in FIG. 3.

The structure of the invention also comprises a series of longitudinal stiffening ribs 27 extending between the bulkheads 11, between the two main members 9 and between the latter and the adjacent bulkheads 11. In other words, ribs 27 extend fully longitudinally of the float 3 except across bulkheads 11 and main members 9.

As shown in FIGS. 2 and 5, stiffening ribs 27 are inwardly directed flangelike members of varying shapes and lengths depending on their location, the dimensions depending on the size of the torsional stresses to be supported. Also, it is preferred to provide stronger ribs 27' and 29 alongside walkways 19, inwardly and outwardly of shell 4.

The inwardly directed transverse ribs 15, 15' are formed as narrow channels having substantially long flanges, respectively 43, 43', as compared to the webs thereof.

The transverse interconnecting rods 7 are received, in known manner, in a sleeve 40 made of glass fibers reinforced plastic and extend inwardly of the shell preferably between the flanges 33 of the main members 9. A special structure, not shown, is provided to solidly retain the interconnecting rods into position. This structure is however well known in the art and need not be described here.

Finally, the float is provided with a set of conventional inspection holes 17 spacedly located along walkway 19. At least one inspection hole 17 should be provided between two adjacent bulkheads 11 or 13 or a bulkhead and the end of the float 3.

As just mentioned, a bulkhead may be formed with the main members 33 by having a corresponding membrane 13 made of glass fibers reinforced plastic material spanning the empty space within the main members 9 and preferably bonded to one of the two flanges 33.

As an additional feature, the float of the invention may be provided with a piping system suitable to place each compartment defined by the successive bulkheads under a slight pressure of say 1.5 to 2 p.s.i. or slightly more than the hydrostatic water pressure beneath the float when the hydroplane lies on a water surface. This is to prevent inflow of water in the compartments should a hole be made through the shell 4 by accidentally hitting an obstacle.

This may simply be a pipe extending lengthwise and inside the float, across the bulkheads and tightly sealed thereto to prevent communication between the successive compartments. One end of the pipe would extend upward through the top of the float and would be provided with a valve for the connection of an air pump. There would be at least one hole through the pipe for each compartment to allow air therein; the holes being closed by one-way valves.

A further additional feature would be the provision of watertight doors at the bottom of the float operable by mechanical, hydraulic or electrical known means controlled from inside the plane. These doors may be provided on two or more central compartments, depending on the size of the float, which could be used as water reservoirs for the extinction of forest fires, rather than mounting special reservoirs for that purpose on the top of the floats as in present practices.

Although a specific embodiment of this invention has just been described, it will be understood that various modifications may be made thereto without departing from the spirit of the invention, the scope of which is set forth in the appended claims.

I claim:
1. A hydroplane float comprising:
   a. an outer elongated shell made entirely of glass fiber reinforced plastic and having at least two load-applying transverse sections;
   b. each of said sections comprising a transverse load-bearing inner member extending completely around the inner surface of said shell, said members made entirely of glass shell, reinforced plastic and entirely to the inner surface of said shell;
   c. a series of spaced transverse stiffening inner ribs projecting upwardly from substantially the lower half of said shell and distributed along substantially the full length of said shell; said transverse ribs entirely made of glass fiber reinforced plastic and bonded to the inner surface of said shell;
   d. a series of spaced longitudinal stiffening inner ribs projecting from substantially the upper half of said shell and extending substantially the full length of said shell, said longitudinal ribs entirely made of glass fiber reinforced plastic bonded to the inner surface of said shell; and
   e. said load-bearing inner members being each formed as a channel-shaped member having two flanges inwardly directed with respect to said shell and connected by a web bonded to the inner surface of said shell.

2. A float as claimed in claim 1 wherein the inward ends of said flanges are rolled to form reinforcing collars.

3. A float as claimed in 1, wherein said transverse stiffening ribs are formed as channel-shaped members, the flanges of which are bonded to said shell, and having a thinning-out cross section at the ends thereof near the upper end of said lower shell.

4. A float as claimed in claim 1, comprising a membrane made of glass fiber reinforced plastic material bonded along the periphery thereof to one of the flanges of each of said members.